May 10, 1960  H. R. EGGERS ET AL  2,935,875
DEVICE FOR ELECTRICALLY TELE-TRANSMITTING
THE MEASURED VALUE OF PRESSURE INDICATORS
Filed Nov. 15, 1955
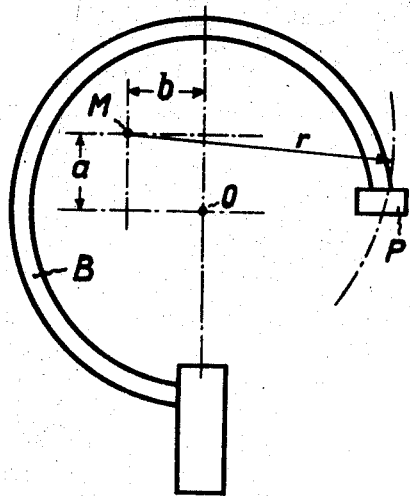
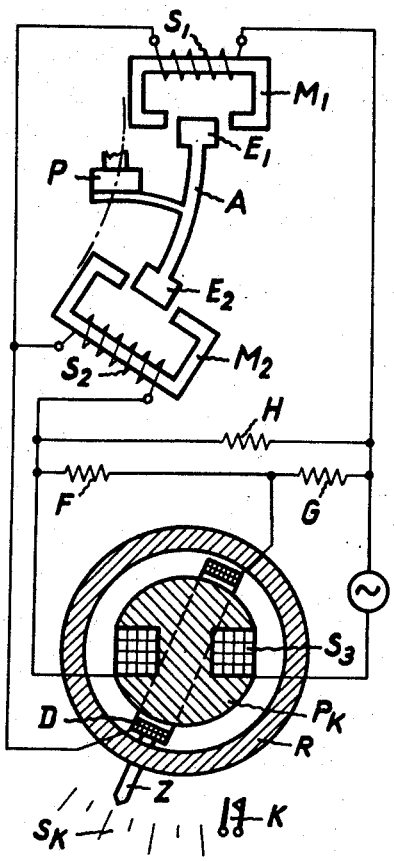
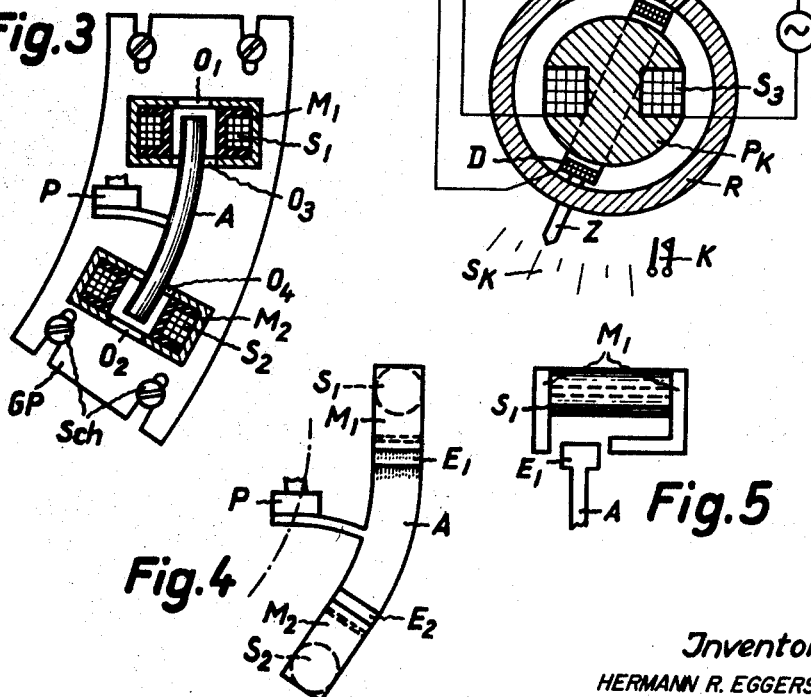
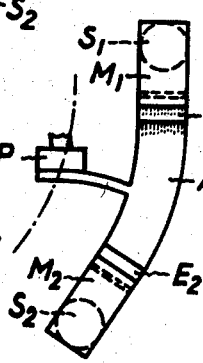
Inventor:
HERMANN R. EGGERS
KARL H. ZEITZ
BY *Taulmin & Taulmin*
Attorneys

United States Patent Office 2,935,875
Patented May 10, 1960

2,935,875

DEVICE FOR ELECTRICALLY TELE-TRANSMITTING THE MEASURED VALUE OF PRESSURE INDICATORS

Hermann Ragnar Eggers and Karl Heinz Zeitz, Heilighaus, Bezirk Dusseldorf, Germany, assignors to Licentia Patent-Verwaltungs-G.m.b.H., Hamburg, Germany Application November 15, 1955, Serial No. 546,905

Claims priority, application Germany November 15, 1954

2 Claims. (Cl. 73—398)

The present invention relates to accurate measurement of pressure, more particularly to the electrical measurement of pressure as indicated by a Bourdon spring.

It is the object of this invention to provide an apparatus to electrically transmit a pressure, measured by means of a Bourdon spring, with a reaction sensitivity of the order of 1 to 1000.

This object is achieved by a device wherein, according to the present invention, the end of the bourdon spring moves, without any interconnecting agency, a ferromagnetic body, the movement of which varies the inductance of one or several coils. Furthermore, according to the present invention, the ferromagnetic body is so arranged relative to the coils that it moves in a transverse direction relative to the magnetic flux induced by the coils.

The reaction sensitivity of the device can be increased if so desired, by a corresponding amplification of the currents or voltages supplied by the inductive transmitter. Particularly preferable is a device wherein the full deflection of the connected electrical receiver (indicating or registering instrument) can be obtained by a change of pressure which is only a fraction of the entire pressure to be measured. If, for instance, a Bourdon spring suitable for the pressure range, in kilopounds per square centimeter, of from 0 to 100 kp./cm.$^2$ is used, the end of this spring moves about 5 mm. as the pressure varies from zero to maximum. If, for example, the pressure range of 40 to 60 kp./cm.$^2$ is to be controlled by the registering or indicating instrument, then for this pressure range a movement of the Bourdon spring of 1 mm. can be used. The electrical intensifier and receiver must thus be fully supplied by this small range of movement of the transmitter. It is further necessary that the transmitter, particularly the ferro-magnetic body connected with the Bourdon spring, can be moved without hindrance over the entire range of pressure for the Bourdon spring.

The invention will be better understood by the following description of the accompanying drawings, wherein Figure 1 is a side elevational view of a Bourdon spring and illustrates the movement of this spring in response to changes of pressure;

Figure 2 is a sectional plan view of a preferred embodiment of the apparatus of the present invention comprising the receiving, transmitting and indicating elements of the same;

Figure 3 is a sectional plan view of a part of the apparatus of the present invention and shows another embodiment of the transmitter device;

Figure 4 is a sectional view of still another embodiment of the transmitter device for the apparatus of the present invention;

Figure 5 is a side view in section of the upper portion of the transmitting device of the apparatus of the present invention shown in Figure 4.

Figure 1 shows a Bourdon spring B having an end point P which moves at changes of pressure approximately in the direction of the arc of a circle with the radius $r$ around the center of motion M. This center of motion M lies above the geometric center O of the Bourdon spring by the distance $a$ and is furthermore transposed to the left by the distance $b$. For the direct connection of the ferromagnetic body of the inductive transmitter with the Bourdon spring, according to the present invention, it is important that the path of the end of the bourdon spring be taken into consideration.

Figure 2 features the example and embodiment of a distant indicating device for pressures. The armature A provided at the end P of the Bourdon spring (which latter is not shown) with the thickened ends $E_1$ and $E_2$ moves in the air gaps of the two magnetic circuits $M_1$ and $M_2$, which are respectively excited by the coils $S_1$ and $S_2$. In this arrangement the air gaps lie perpendicular to the axis around which the end of the Bourdon spring is moved. It is the distinctive feature of the present invention, that the ferromagnetic body A—$E_1$—$E_2$ is so arranged within the transmitter system, that their movement in the air gaps follows a direction which is transverse relative to the direction of the magnetic flux in the magnetic circuits $M_1$ and $M_2$, respectively.

According to a preferred embodiment of the invention, the movement of the ferromagnetic body A—$E_1$—$E_2$ is defined by the surface of an imaginary cylinder the axis of which coincides with the axis around which the free end P of the Bourdon spring B moves.

The coils of the transmitter $S_1$ and $S_2$, are connected with stationary resistors F and G of a bridge arrangement. The entire bridge current flows through an exciting coil $S_3$ of an electro-dynamic measuring instrument. This exciting coil is wound on a pole core $P_K$. The magnetic flux enters by the air gap of the device, in which a moving coil D is pivotally mounted and closes by way of the ground R. An indicator Z, which indicates the measured values on a scale $S_K$, is connected with the moving coil D. When the instrument reaches its maximum deflection, the contact K is actuated by the indicator. The contact may then actuate either directly or indirectly an alarm device or regulate an operation. The resistance H serves for adjusting the range of measurement. The voltage across the bridge arrangement feeds the moving coil D through leads (not shown) which are practically free from the directive force. The voltage induced by the coil $S_3$ in the moving coil D generates a current which flows over the bridge arrangement and is so directed as to draw said moving coil into a position where the voltage induced in said coil equals zero. The instrument thus adjusts itself automatically to the symmetric position. As soon as the armature A is shifted by the Bourdon spring, the voltage at coils $S_1$ and $S_2$ changes, whereby the bridge is out of balance and as a consequence thereof the moving coil of the indicating instrument is adjusted until the symmetric position is again achieved. For each position of the armature A there is a well-defined corresponding position of the moving coil D. As long as the magnetic circuits $M_1$ and $M_2$ are not saturated, the adjustment of the moving coil is independent of the magnitude of the alternating current feeding the entire device.

The two ends $E_1$ and $E_2$ of armature A are, as shown, thickened so as to keep the magnetic flux of the magnetic circuits $M_1$ and $M_2$ as low as possible at all positions of the armature, without unduly increasing the total weight of the armature.

As can be seen from the device as described, the armature A has a rather great range of movement. The deflection of the armature is not limited even when the indicating instrument is already adjusted to the maximum deflection of the transmitter device.

In place of the transmitter device as shown in Figure 2, according to Figure 3 a transmitter is used in which the armature consists of a curved iron tube A which has its ends passing into two coils $S_1$ and $S_2$. The outer ends of the coils are sealed by two iron circles $M_1$ and $M_2$. These iron circles have two apertures $O_3$ and $O_4$ into which the ends of the armature A pass. The air gaps formed between the additional apertures $O_1$ and $O_2$ and the ends of the armature A are arranged for the measurement proper. As apertures $O_1$ and $O_2$ are smaller than apertures $O_3$ and $O_4$, adjustment of the device is simplified. The whole transmitter device is mounted on a base plate GP which is so arranged that it can be shifted for adjustment of the scale center and fastened with the aid of screws $Sch$. The adjustment of the base plate can also be additionally simplified by micrometer screws.

A further transmitter arrangement is shown in Figure 4. The armature A moves its ends $E_1$ and $E_2$ into the iron circles $M_1$ and $M_2$ of coils $S_1$ and $S_2$. According to this embodiment of the invention, the ferromagnetic body A—$E_1$—$E_2$ moves along a plane which is vertical relative to the axis around which the free end P of the Bourdon spring moves.

Figure 5 shows the upper part of the arrangement according to Figure 4 and is a side view thereof. The air gaps lie in this arrangement parallel to the axis around which the end point P of the Bourdon spring moves.

In view of the very close measuring accuracy it is preferable to use precision Bourdon springs for the arrangements as described herein. As the resiliency of these springs are different in a direction parallel to the axis and in a direction perpendicular to the axis and as the coils $S_1$ and $S_2$ are excited with alternating current, there is the danger that the armature is incited to vibrations and in small air gaps will hit the iron parts of the magnetic circles. It has been found through experiments that the arrangement according to Figure 2 is the most favorable when the excitations are relatively great.

In order to avoid influences of the measurements by foreign electrical fields or by adjacent iron parts, it is preferable to shield the transmitter devices of Figure 2, Figure 4 and Figure 5.

In place of the receiver described in Figure 2, any other desired receivers can be used. Particularly preferable for a large indication is a servo or follow-up receiver, wherein an additional inductive transmitter, which is connected with the indicator, is adjusted and shifted by a motor until the position of the indicators corresponds to the position of the measuring armature. The position of the inductive transmitter which is moved by the bourdon spring can also be photo-electrically scanned, whereby the intensifier of the photoelectric cells influences a servo motor serving as receiver, the shifting of which motor can be used for indication, registration and regulation.

It will be understood that this invention is susceptible to modification in order to adapt it to different usages and conditions, and, accordingly, it is desired to comprehend such modification within this invention as may fall within the scope of the appended claims.

What is claimed is:

1. An apparatus for measuring pressure and electrically telemetering the same, comprising, in combination, a Bourdon tube having a free end movable along a circular arc about an axis; a ferromagnetic body carried by said Bourdon tube at said free end thereof, said ferromagnetic body being arcuate and the axis of said body being substantially coincident with said arc; a pair of ferromagnetic coil means each having an air gap, said coil means being arranged in the path of movement of said body in such a manner that said body may enter each of said air gaps and be displaceable therein in transverse direction relative to the magnetic flux of the respective coil means, thereby changing the sizes of the respective air gaps and consequently the inductances of the respective coil means so that the inductance of one of said coil means is increased while the inductance of the other of said coil means is decreased, and vice versa; and circuit means interconnecting all of said coil means with a source of alternating current to form a bridge circuit in which an equalizing current may flow through said coil means of said measuring instrument, whereby the indication of said measuring instrument is a function of the inductances of said pair of ferromagnetic coil means and consequently of the pressure to which said Bourdon tube is subjected.

2. An apparatus as defined in claim 1, wherein said ferromagnetic body has a substantially circular cross-section.

References Cited in the file of this patent

UNITED STATES PATENTS

| | | |
|---|---|---|
| 1,028,851 | Bard | June 11, 1912 |
| 1,820,738 | Gruss | Aug. 25, 1931 |
| 2,269,453 | Gayhart | Jan. 13, 1942 |
| 2,380,242 | Jewell | July 10, 1945 |
| 2,430,757 | Courad | Nov. 11, 1947 |
| 2,488,734 | Mueller | Nov. 22, 1949 |
| 2,531,414 | Engvall | Nov. 28, 1950 |
| 2,563,899 | Wiancko | Aug. 14, 1951 |
| 2,631,272 | Smith | Mar. 10, 1953 |
| 2,662,223 | Brewer | Dec. 8, 1953 |